(12) United States Patent
Kroesser et al.

(10) Patent No.: US 7,182,854 B1
(45) Date of Patent: Feb. 27, 2007

(54) SANITATION SYSTEM

(75) Inventors: John Kroesser, Pembroke Pines, FL (US); Paul Mellinger, Fort Lauderdale, FL (US); Mark Mellinger, Pompano Bch, FL (US); Lynn Wallace, Ft. Lauderdale, FL (US); Art Smith, Pompano Bch, FL (US); Randy Lego, Pompano Bch., FL (US); Scott Hudson, Jensen Beach, FL (US); Melvyn Wayne Mellinger, Fort Lauderdale, FL (US)

(73) Assignee: Headhunter, Inc., Fort Lauderdale, FL (US)

( * ) Notice: Subject to any disclaimer, the term of this patent is extended or adjusted under 35 U.S.C. 154(b) by 290 days.

(21) Appl. No.: 10/888,319

(22) Filed: Jul. 9, 2004

Related U.S. Application Data

(60) Provisional application No. 60/486,117, filed on Jul. 10, 2003.

(51) Int. Cl.
  *C02F 1/70* (2006.01)
  *C02F 1/76* (2006.01)
  *C02F 1/78* (2006.01)

(52) U.S. Cl. .................. 210/86; 210/97; 210/117; 210/173; 210/195.3; 210/198.1; 210/257.1; 210/258; 210/411

(58) Field of Classification Search ............ 210/104, 210/105, 172–174, 195.3, 197, 199, 205, 210/257.1, 257.2, 258, 411, 433.1, 86, 97, 210/117, 136, 198.1
See application file for complete search history.

(56) References Cited

U.S. PATENT DOCUMENTS

| | | | | |
|---|---|---|---|---|
| 3,401,115 A | * | 9/1968 | Meyer et al. | 210/756 |
| 3,480,543 A | * | 11/1969 | Hildebrand | 210/754 |
| 3,782,550 A | * | 1/1974 | Materese | 210/134 |
| 5,837,142 A | * | 11/1998 | Mullerheim et al. | 210/650 |

* cited by examiner

Primary Examiner—Matthew O. Savage
(74) Attorney, Agent, or Firm—Buskop Law Group PC; Wendy K. Buskop

(57) ABSTRACT

A sanitation system comprising of a first tank for receiving waste water fluid typically comprising solids, a maceration pump for pulling waste water fluid from the first tank, a cross flow filter comprising of media for receiving the sheared fluid forming unfiltered waste water and product water, a second tank for receiving the product water from a product water manifold connected to the second segment, a vented loop in communication with the second tank for receiving raw water and displacing product water from the second tank, a macerating water jet adapted to pull product water into the vented loop and on demand further macerate the product water, then into a third tank for receiving water from the vented loop and raw water for de-chlorinating the product water, and a control panel comprising a microprocessor to optimize the operation of the sanitation system.

19 Claims, 4 Drawing Sheets

SANITATION SYSTEM

The present application claims priority to co-pending U.S. Provisional Patent Application Ser. No. 60/486,117 filed on Jul. 10, 2003.

FIELD

The present embodiments relate to a sanitation system designed to treat and manage sewage wastewater aboard commercial, personal watercraft, recreational vehicles, and other transportation vehicles.

BACKGROUND

Waste disposal has long been a problem for owners of boats, recreational vehicles, and other transportation vehicles. In most places, the indiscriminate dumping of raw or untreated waste material is prohibited by environmental regulations. Accordingly, a variety of different waste disposal systems have been previously proposed.

Generally, waste disposal systems employ a treatment tank into which the waste material from a water closet or head is placed. Chemicals are added to the treatment tank and allowed to interact with the waste material for a sufficient time to kill the bacteria. Many of these systems employ macerators to chop or break up the waste material into small particles and to mix the waste material with a chemical solution in the tank to enhance chemical action. After a sufficient period of time for the bacteria to be killed or reduced to an acceptable level, the contents of the tank are discharged into the environment.

Single tank chemical systems have a number of disadvantages. The chemicals, which they employ, are expensive and produce a strong unpleasant odor. Moreover, chemical systems are not always totally effective in killing bacteria; therefore, the discharged waste material may still cause pollution and environmental problems.

A need exists for a sanitation system which uses fewer chemicals and has improved reliability and serviceability. The embodied system and processes provide for a mechanically manageable wastewater fluid treatment system with virtually no human exposure to potentially harmful oxidation materials.

SUMMARY

The embodied sanitation systems include three tanks and a macerating pump that pulls waste water fluid from the first tank and shears the solids in the waste stream to form a discharge stream. The discharge stream flows across a cross flow filter, wherein the solids are filtered through a media forming unfiltered waste water fluid and product water. The unfiltered waste water fluid flows back into the first tank. The product water flows to a product water manifold with two outlets. If the height of the waste water fluid in the first tank is above a first product water manifold outlet, the product water flows into the second tank. If the height of the waste water fluid in the first tank is below a product water manifold outlet, the product water flows back into the first tank. The second tank communications to a vented loop that additionally can receive raw water from a water pump and facilitate pulling product water from the second tank. The vented loop can cause the product water to be pulled through a device, such as a macerating jet, before going though a vented loop into a third tank. A control panel comprising of a microprocessor is connected to the maceration pump, and if used the raw water pump, a discharge pump, solenoid valves, and the macerating water jet to optimize operation of the sanitation system.

BRIEF DESCRIPTION OF THE DRAWINGS

The present embodiments will be described further with reference to the appended drawings, in which.

The present embodiments are detailed below with reference to the listed Figures.

DETAILED DESCRIPTION OF THE PREFERRED EMBODIMENTS

Before explaining the present embodiments in detail, it is to be understood that the embodiments are not limited to the particular embodiments and that it can be practiced or carried out in various ways.

The invention relates to sanitation systems. The invention provides a system for treating waste fluid which does not require the dumping of waste water with solids. The system is beneficial in that it permits users of the system a method to not pollute the environment and provides cleaner water from a sanitation system. Instead of flushing waste water fluid into the environment or having to make frequent inconvenient trips to a waste water disposal location, the system is designed to treat and manage sewage waste water aboard commercial and personal watercraft or recreational vehicles independently. The invention operates as a treatment system in an economical and efficient manner. The unique design permits a cost effective manner of construction and low cost of repair when the system requires maintenance.

The system macerates waste water fluid in a first tank forming a sheared fluid. This sheared fluid is then filtered through filter, preferably a cross flow filter, which can be back washed, forming unfiltered waste water and product water. The unfiltered waste water is returned to the first tank. The product water is communicated to a product water manifold and then returned to the first tank when the waste water fluid level is below a first outlet of the product water manifold outlet. Product water is flowed through the product water manifold outlet to a second tank when the waste water fluid level covers the product water manifold outlet. From the second tank, the product water flows into a vented loop to a third tank where it is de-chlorinated by diluting the fluid with raw water from a raw water source forming de-chlorinated water. The product water in the second tank is pulled into the vented loop through a macerating water jet which can be off or in an operational mode. Optionally the waste water fluid can be oxidized in the first tank and/or additionally oxidized and additionally de-chlorinated in the third tank.

Figure 1:
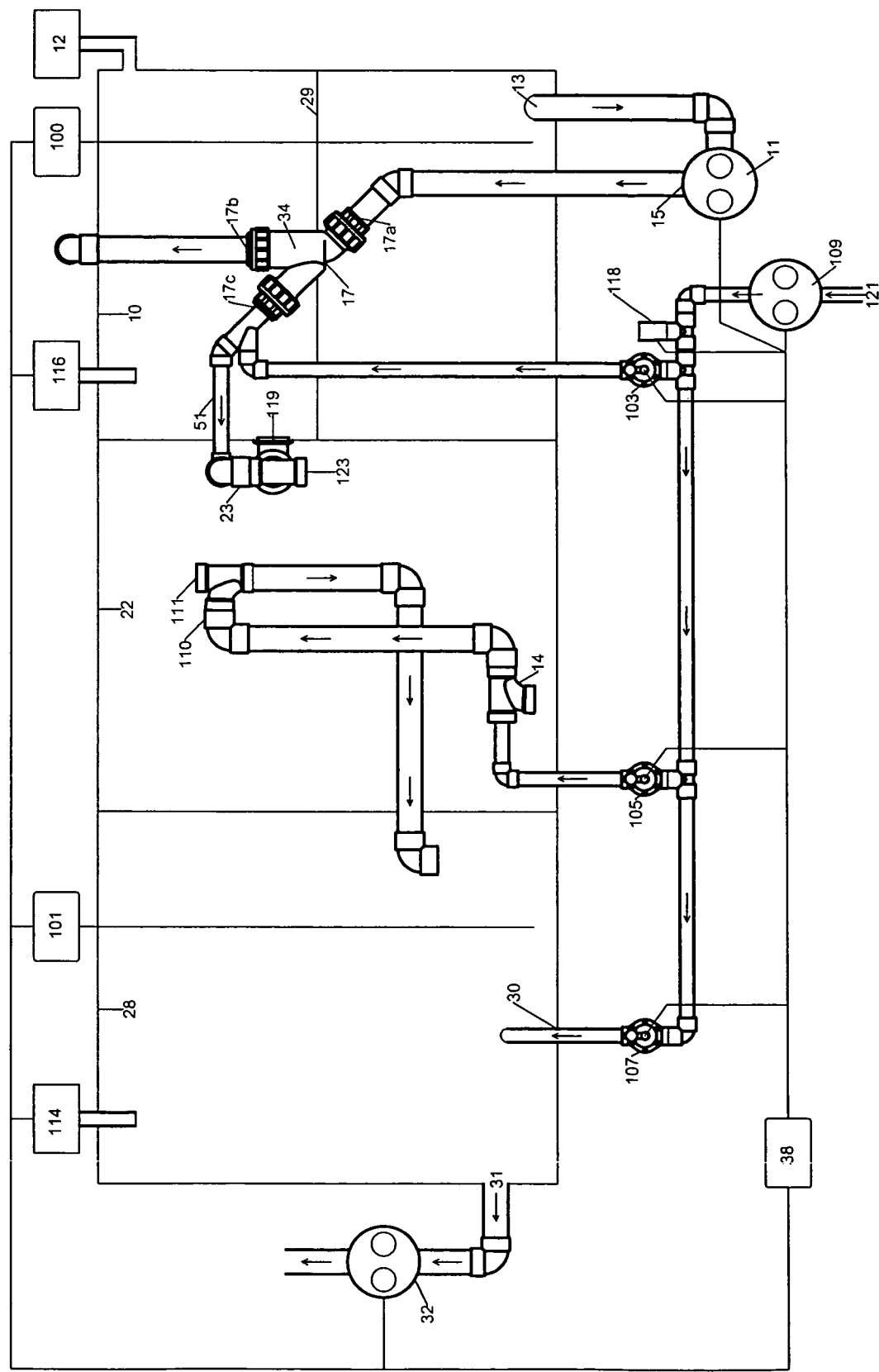
FIG. 1 depicts a side schematic view of an embodiment of a sanitation system.

With reference to the figure, in FIG. 1 the system utilizes three tanks: a first tank 10, a second tank 22, and a third tank 28.

The first tank 10 receives waste water fluid 29 through inlet 12 and then discharges the waste water fluid 29 through an outlet 13 to a maceration pump 11. The maceration pump 11 operates continuously. The maceration pump 11 shears solids, if any, in the waste water fluid 29 and directs the sheared fluid 15 to a cross flow filter 17.

Figure 2:
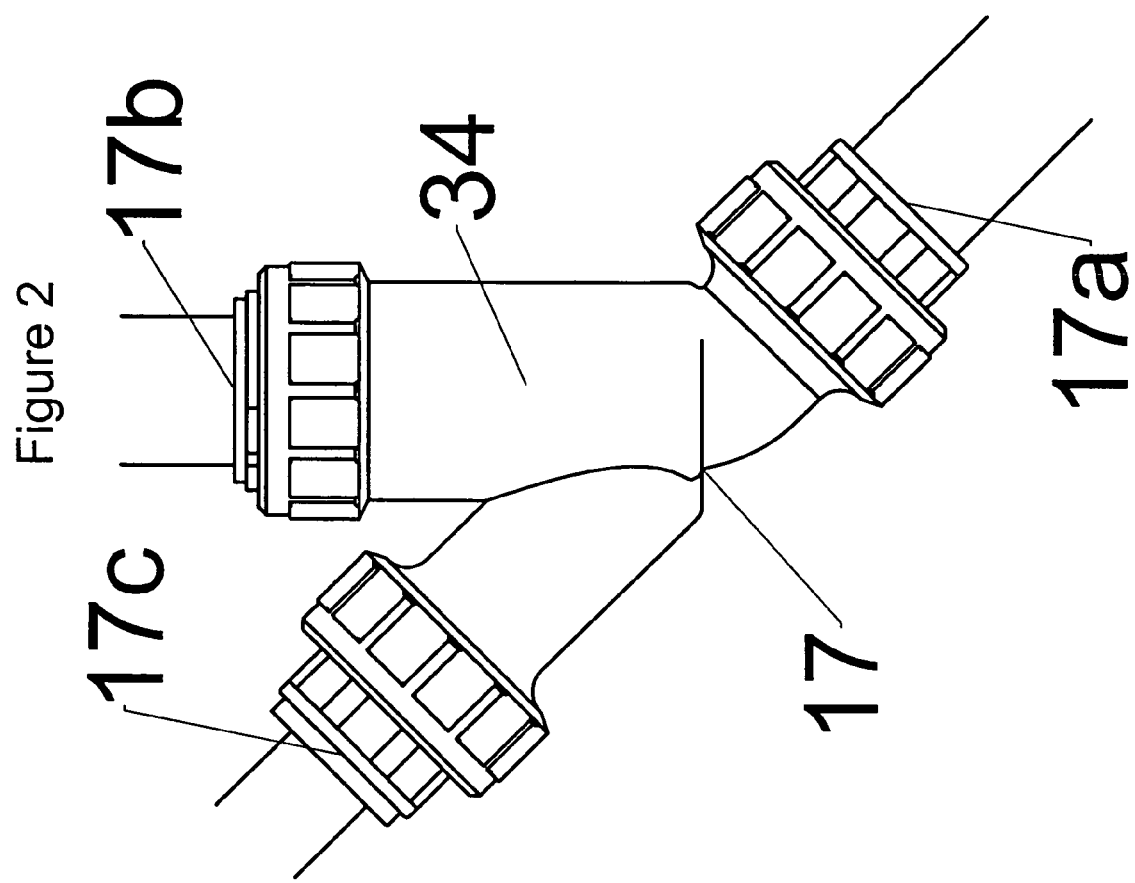
FIG. 2 depicts a detailed view of the cross filter of an embodiment of a sanitation system.

FIG. 2 depicts the cross flow filter 17 in more detail. As shown in FIG. 2 the cross flow filter 17 has a first segment 17a that receives the sheared fluid 15 from the maceration pump 11. The sheared fluid 15 flows across media 34. Some of the sheared fluid 15 travels up the media 34, preferably through the center, to become product water 51. The product water 51 flows through a second segment 17c and out of the first tank 10. Additional fluid, such as raw water is introduced to the media 34 from a raw water pump 109 connected to a raw water source 121 to keep the media 34 clear of particulate matter. This raw water can be controlled by a first solenoid valve 103, which can be located between the raw water pump 109 and the cross flow filter. This fluid flow back flushes the solids from the media to keep the cross flow filter 17 clean. Unfiltered waste water 53 from media 34 flows into the third segment 17b and back into the first tank 10.

Figure 3:
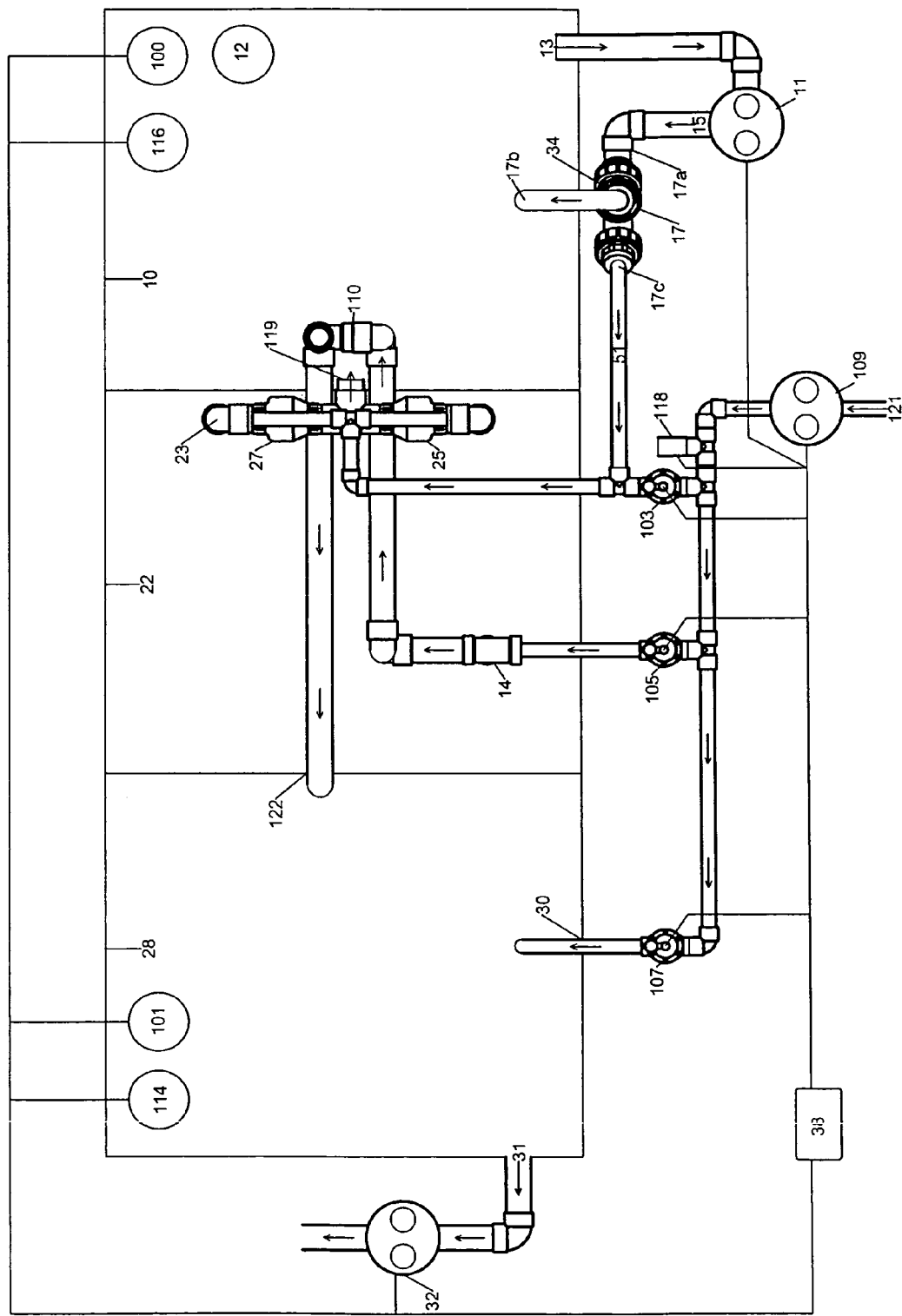
FIG. 3 depicts a top view of another embodiment of the sanitation system.

It should be noted that FIG. 1 shows an embodiment wherein the cross flow filter 17 is located within first tank 10 and FIG. 3 shows a different embodiment with the cross flow filter 17 outside of first tank 10.

Returning to FIG. 1, raw water is provided using the raw water pump 109 from a raw water source 121. Product water 51 from cross flow filter 17 flows into the product water manifold 23. The product water manifold 23 can have one or more one-way valves, which preferably are check valves, shown as one-way valve 25, to direct product water 51 into either the first tank 10 or the second tank 22 from the product water manifold. The embodiment depicted in FIG. 3 shows two one-way valves 25 and 27 used for a two outlet product water manifold.

The product water manifold 23 is located in the second tank 22 at a specified height. The product water manifold 23 has a first product water manifold outlet 119, and a second product water manifold outlet 123. If the waste water fluid 29 in the first tank is below the first product water manifold outlet 119, the water from the cross flow filter 17 is passed into the first tank 10. If the waste water fluid 29 level in the first tank 10 is above the first product water manifold outlet 119, the product water 51 from the cross flow filter 17 is passed into the second tank 22.

Raw water from the raw water source 121 can be pumped by the raw water pump 109 to a second solenoid valve 105. The raw water pump 109 can push the product water 51 to and through a macerating water jet 14 located in the second tank 22. The macerating water jet 14, can be used to create a Venturi effect and pull product water 51 from the second tank 22 through the macerating water jet 14 and into a vented loop 110. The vented loop 110 preferably has a vented loop opening 111 at the top of the vented loop 110 to create a suction effect to pull product water 51 through the vented loop 110, and evacuated into the third tank 28. The macerating water jet 14 may or may not be operating as a maceration device during this fluid flow.

Raw water from the raw water pump 109 flows to the third tank, optionally using a third solenoid valve 107 and into the third tank 28 through third tank inlet 30. Product water 51 in the third tank is de-chlorinated with the raw water. The de-chlorinated water 59 is pulled through an third tank outlet 31 such as by a discharge pump 32 and is removed from the system. A de-chlorinator 114 can be optionally used with the third tank 28 to add sodium thiosulfate to the fluid in the third tank in an amount ranging from about 1 pound to about 25 pounds to facilitate de-chlorination of water in the third tank.

An oxidizer 116 may be used with first tank 10 to add oxidizer to the waste water fluid 29 in the first tank 10.

Types of oxidizers usable in these sanitation systems include chlorine, bromine, ozone, hydrogen peroxide, combinations thereof, and other compounds that have similar oxidizing properties. Other oxidizers for use with these sanitation systems include trichloroisocyanuric acid, calcium hypochlorite, sodium hypochlorite, and combinations thereof.

The cross flow filter 17 contains media 34 that is preferably a disposable membrane. A cylindrical membrane is typically used in the preferred embodiment. Examples of usable disposable membranes include polypropylene membrane, a polyethylene membrane, and a polyamide membrane with Nylon™. The polyamide membrane is the preferred material and is available from the Dupont Company of Wilmington, Del. The membranes can be mesh. The media can be a plurality of monofilament fibers or a nonwoven polymer, which can be extruded. The disposable membranes usable herein preferably have a pore sizes that range from about 100 microns to about 2000 microns, with a 1200 micron pore size being a preferred pore size.

Figure 4:
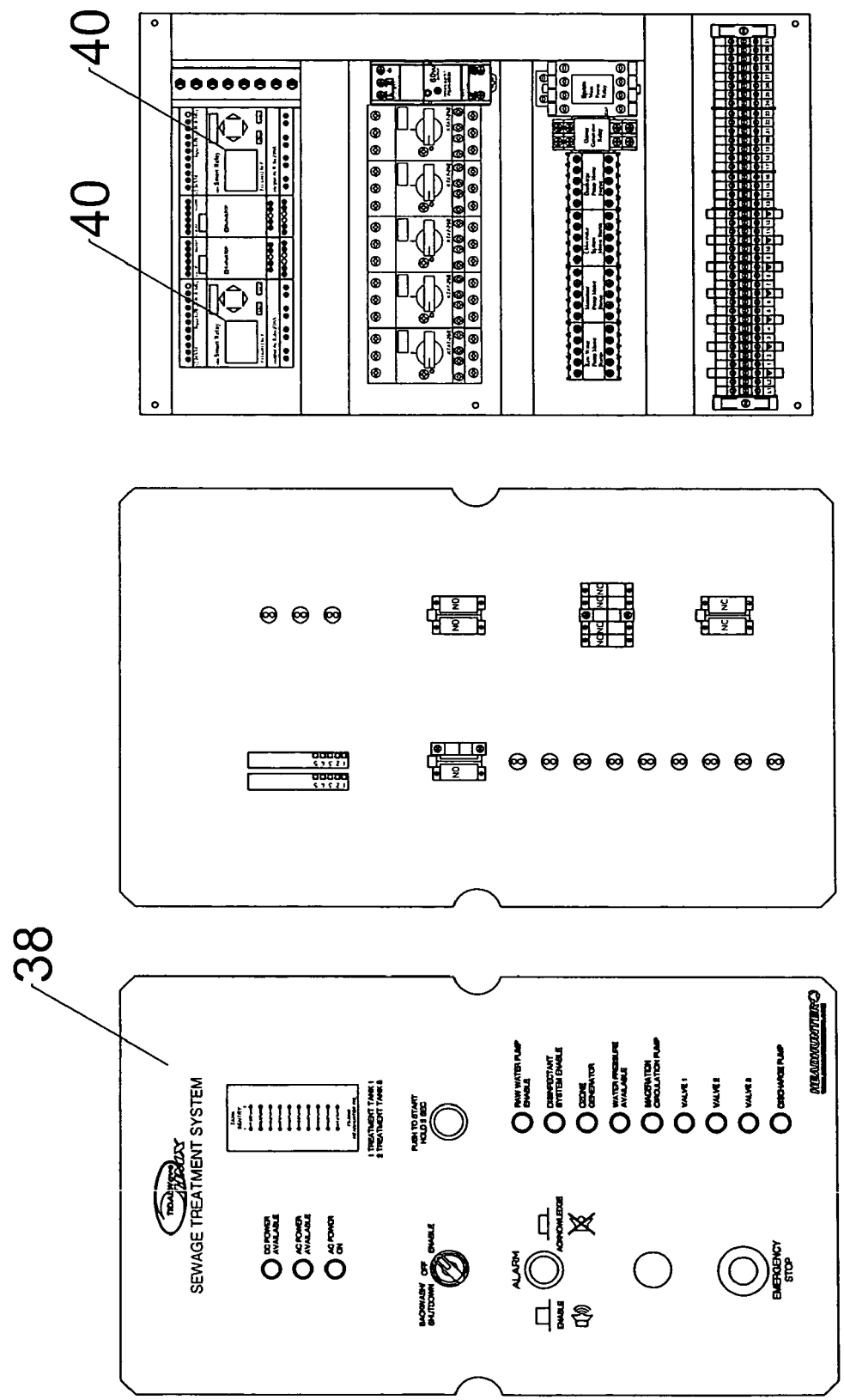
FIG. 4 depicts the control panel of an embodiment of a sanitation system.

As depicted in FIG. 1, FIG. 3, and FIG. 4, the sanitation system can have a control panel 38 connected to the various devices of the system. The control panel preferably has microprocessor 40 connected to discharge pump 32, which can be an semi open impeller pump or diaphragm pump. The control panel 38 can activate and deactivate the discharge pump 32. The control panel 38 can open and close macerating water jet 14. The control panel 38 can be used to control a pressure switch 118 located between the raw water pump 109 and the tanks. The control panel can also control the maceration pump 11, raw water pump 109, and the solenoid valves 103, 105, and 107.

In an alternative embodiment, the sanitation system can further include using one or more electronic monitors to sense fluid levels in the tanks. FIG. 1 shows a first monitor 100 in first tank 10 to monitor the level of waste water fluid 29. A second monitor 101 is shown in the third tank 28 to detect the level of de-chlorinated water 59. The monitor or monitors are preferably in communication with the microprocessor 40 of the control panel 38 which is adapted to activate and deactivate the various equipment based on comparisons of the fluid levels to preset limits stored in the microprocessor 40.

It should be noted that the waste water fluid 29 can be macerated and oxidized simultaneously with this system.

The sanitation system and method of use can be adapted for use on any type of buoyant vessel such as a boat or used on, a drilling platform or on a recreational vehicle.

The sanitation system and method can be adapted for use on a liquid waste stream or any type of mixture of liquid and solid wastes treating between about 10 gallons to about 50,000 gallons of waste water per day.

While these embodiments have been described with emphasis on the preferred embodiments, it should be understood that within the scope of the appended claims, these embodiments might be practiced and carried out in various ways other than as specifically described herein.

What is claimed is:

1. A sanitation system comprising of:
   a. a first tank for receiving waste water fluid;
   b. a maceration pump for pulling waste water fluid from the first tank, wherein the maceration pump macerates solids in the waste water and provides a sheared fluid;
   c. a cross flow filter comprising of media for receiving the sheared fluid in a first segment forming unfiltered waste water and product water, wherein the unfiltered waste water flows through a third segment and into the first tank, and wherein the product water flows through a second segment;
   d. a second tank for receiving the product water from the second segment;
   e. a product water manifold comprising a one-way valve in communication between the first tank and the second tank, comprising: a first product water manifold outlet that flows into the first tank, and a second product water manifold outlet that flows into the second tank, wherein the one-way valve allows the product water to flow to the first tank when the waste water fluid is below the first product water manifold outlet, and wherein the one-way valve allows the product water to flow to the second tank when the waste water fluid is above the first product water manifold outlet;
   f. a vented loop in communication with the second tank for receiving raw water and displacing product water from the second tank;
   g. a macerating water jet adapted to pull product water through the vented loop and into a third tank and on command, macerates the product water; and
   h. a control panel comprising a microprocessor connected to the maceration pump, and macerating water jet to optimize operation of the sanitation system.

2. The sanitation system of claim 1, further comprising a first solenoid valve between a raw water source and the cross flow filter for backwashing the cross flow filter.

3. The sanitation system of claim 1, further comprising a second solenoid valve between a raw water source and the macerating water jet for controlling water flow.

4. The sanitation system of claim 1, further comprising a third solenoid valve between a raw water source and the third tank for controlling raw water to the third tank.

5. The sanitation system of claim 1, wherein the cross flow filter comprises a disposable membrane.

6. The sanitation system of claim 5, wherein the disposable membrane is selected from the group consisting of a polyethylene, a polyamide, a polypropylene, and combinations thereof.

7. The sanitation system of claim 5, wherein the disposable membrane comprises a non-woven polymer.

8. The sanitation system of claim 5, wherein the disposable membrane comprises a pore size ranging from about 100 microns to about 2000 microns.

9. The sanitation system of claim 1, further comprising a pressure switch between a raw water pump connected to a raw water source and the tanks, wherein the pressure switch and the raw water pump are in communication with the control panel.

10. The sanitation system of claim 1, wherein the sanitation system treats between about 10 gallons to about 50,000 gallons of waste water per day.

11. The sanitation system of claim 1, wherein the waste water fluid is a liquid waste stream or a mixture of liquid and solid wastes.

12. The sanitation system of claim 1, further comprising an oxidizer in communication with the first tank.

13. The sanitation system of claim 12, wherein the oxidizer supplies an oxidizing compound to the first tank selected from the group consisting of a chlorine, a bromine, an ozone, a hydrogen peroxide, and combinations thereof.

14. The sanitation system of claim 12, wherein the oxidizer supplies an oxidizer compound to the third tank which is selected from the group consisting of trichloroisocyanuric acid, calcium hypochlorite, sodium hypochlorite, and combinations thereof.

15. The sanitation system of claim 1, further comprising a discharge pump to remove de-chlorinated water from the third tank.

16. The sanitation system of claim 15 wherein the discharge pump is a semi open impeller pump or a diaphragm pump.

17. The sanitation system of claim 1, further comprising of first monitor in the first tank and a second monitor in the third tank to monitor fluid levels.

18. The sanitation system of claim 1, further comprising a de-chlorinator in communication with the third tank for adding sodium thiosulfate to fluid in the third tank in an amount from ranging from about 1 pound to about 25 pounds.

19. The sanitation system of claim 1, wherein the sanitation system is adapted for use on a buoyant vessel or recreational vehicle.

* * * * *